Jan. 18, 1938.  E. RAWSON ET AL  2,105,822
FEED WATER HEATING SYSTEM
Filed Aug. 15, 1935   3 Sheets-Sheet 1
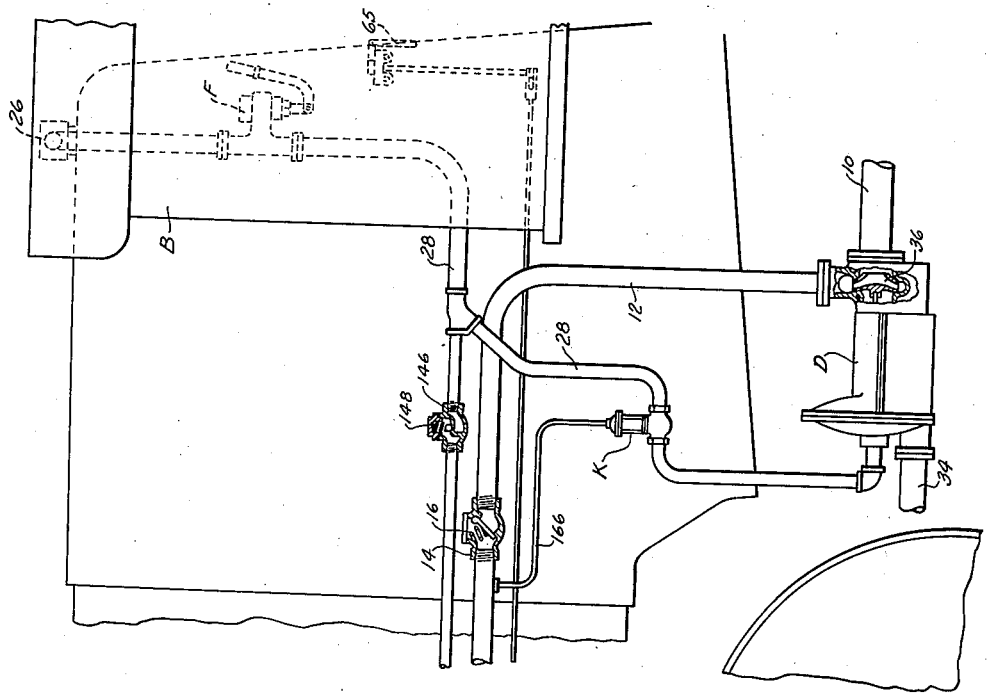
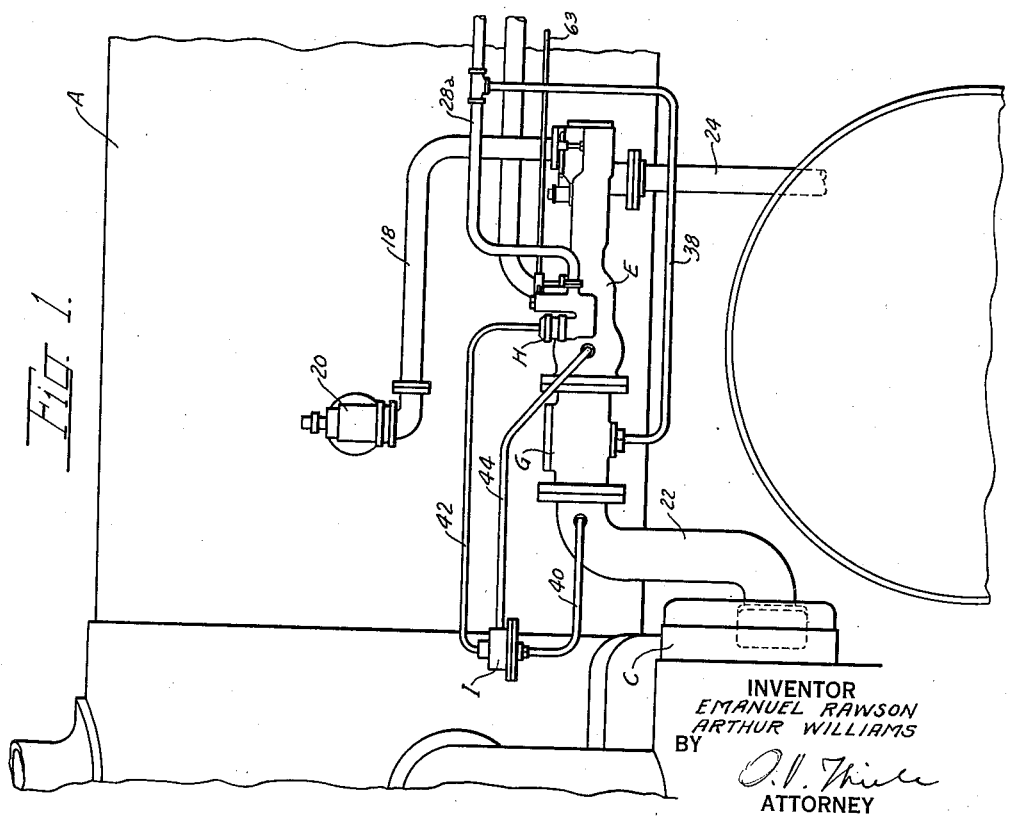
INVENTOR
EMANUEL RAWSON
ARTHUR WILLIAMS
BY
ATTORNEY Jan. 18, 1938.  E. RAWSON ET AL  2,105,822
FEED WATER HEATING SYSTEM
Filed Aug. 15, 1935  3 Sheets-Sheet 2
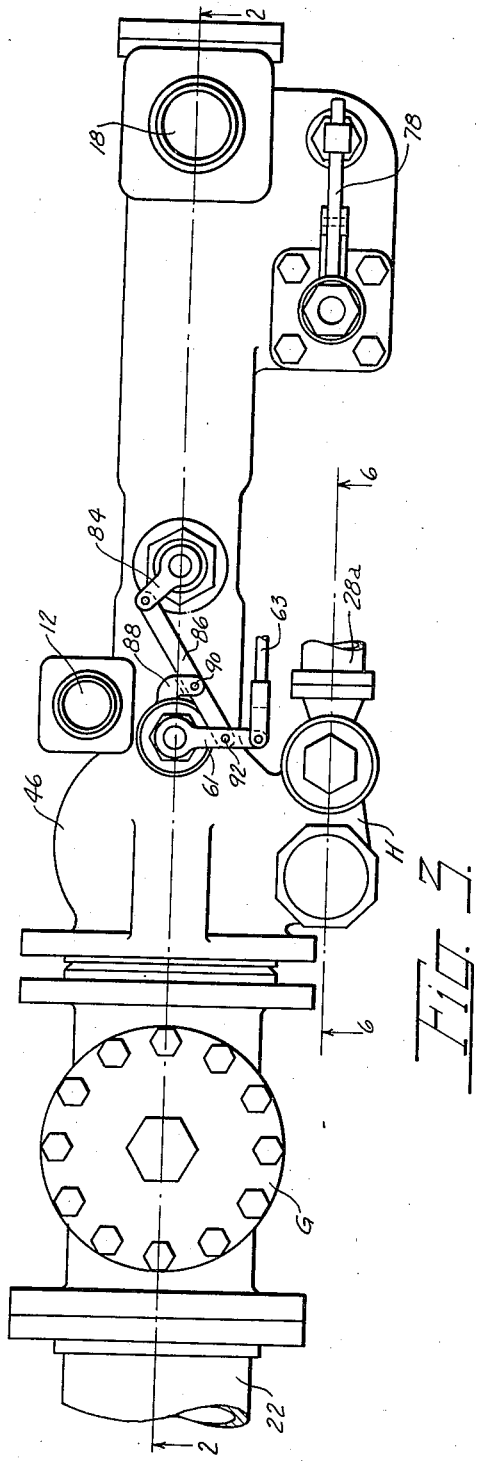
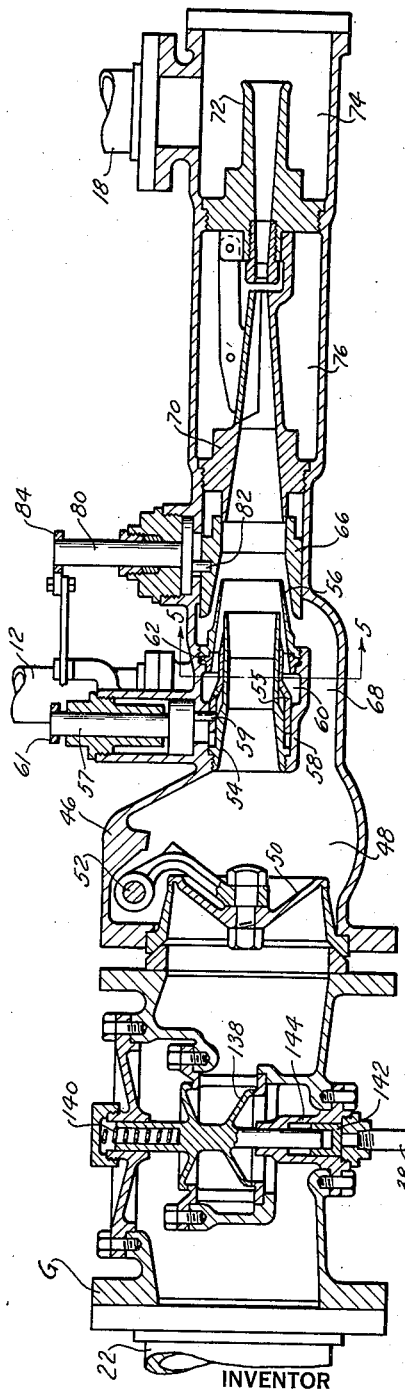
INVENTOR
EMANUEL RAWSON
ARTHUR WILLIAMS
BY
O. V. Thies
ATTORNEY

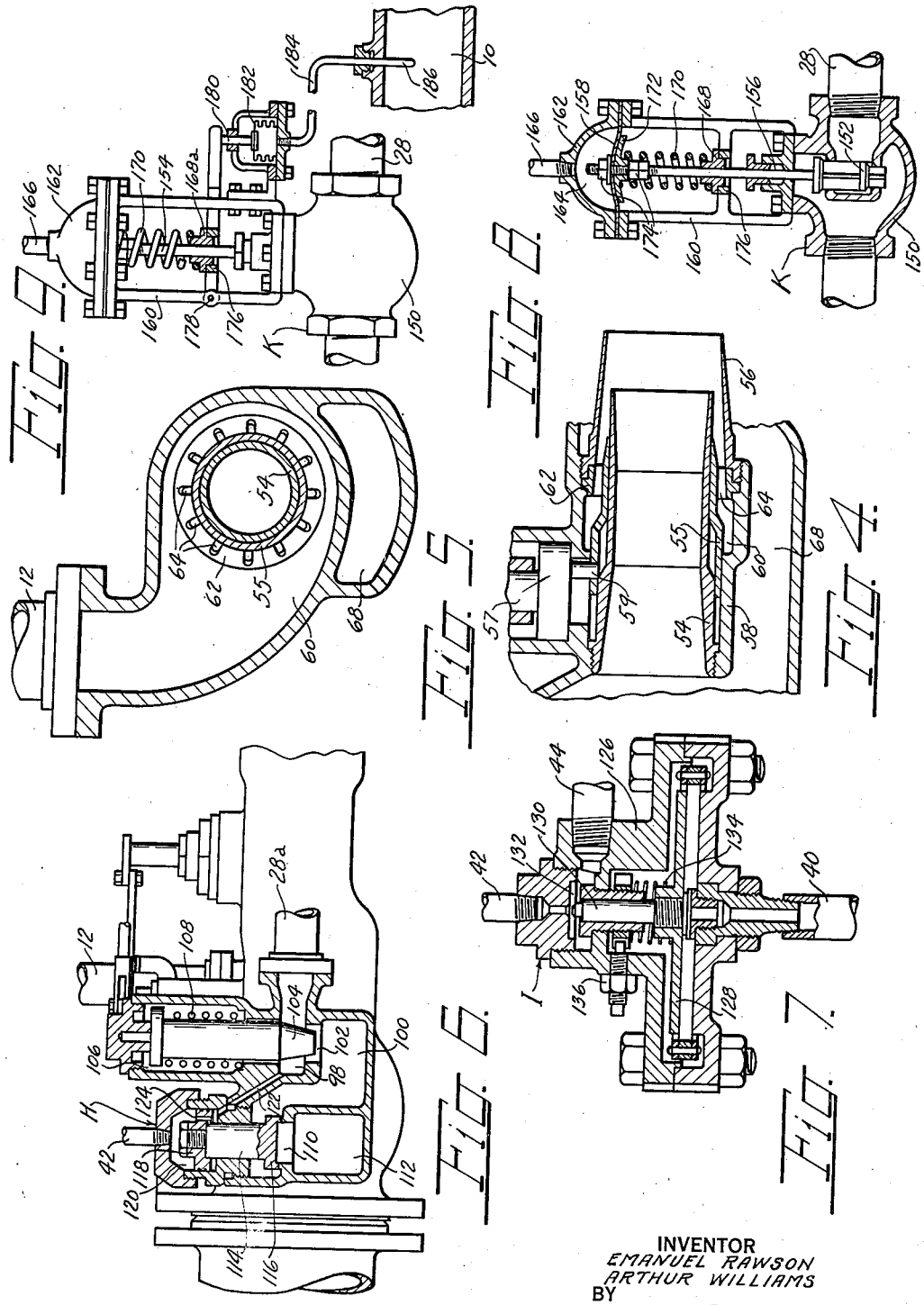

Patented Jan. 18, 1938

2,105,822

UNITED STATES PATENT OFFICE 2,105,822

FEED WATER HEATING SYSTEM

Emanuel Rawson, Chicago, Ill., and Arthur Williams, Munster, Ind., assignors to The Superheater Company, New York, N. Y.

Application August 15, 1935, Serial No. 36,364

17 Claims. (Cl. 103—265)

The present invention relates to feed water heating systems for boilers and has particular reference to feed water heating systems for locomotive boilers.

In the interests of boiler efficiency, it is desirable to feed water to a boiler at as high a temperature as possible and in the case of a locomotive boiler it is also highly desirable in the interests of fuel economy to preheat the boiler feed water with heat recovered from the exhaust steam of the engine. The recovery of such heat, in the case of a locomotive, represents a net gain, for ordinarily in a locomotive the heat of the exhaust steam is wasted.

In order to recover some of the heat of the exhaust steam and to provide preheated feed water for locomotives, numerous different forms of preheating equipment have been heretofore proposed among which the most important are the systems comprising a boiler feed pump and a feed water heater, and systems comprising an exhaust steam injector, that is, an injector in which a part of the power necessary to force water to the boiler is derived from the condensation of exhaust steam.

The operating conditions affecting the operation of a locomotive boiler feed water heating system are extremely severe in that for a system of this character to be satisfactory, it is necessary for the system to be able to operate throughout a wide range of capacities and to operate with feed water which in many instances is very impure and which moreover may be supplied to the system at widely varying initial temperatures.

When operating under these severe conditions, both the pump and feedwater heater systems and the exhaust steam injector systems are capable of producing commercially successful results but each of these types of systems has very definite inherent limitations which render the performance of the systems short of that which it is desirable to attain.

The principal object of the present invention is therefore to improve upon prior types of boiler feed water heating systems and to this end the invention contemplates supplying feed water to a boiler from an exhaust steam injector of the forcing type which in turn receives feed water delivered under substantial pressure to the injector from separate pumping means which is preferably in the form of a mechanical pump. A further object is to provide a system of this character in which the water is fed to the injector in a manner, to be hereinafter more fully explained, which enables the system to operate satisfactorily throughout a wide range of capacities.

Other and more detailed objects of the invention together with the advantages to be derived from its use will appear as the ensuing description proceeds.

In order that the nature of the invention and the improved results obtained by its use may best be understood, a practical example of apparatus embodying the invention and illustrated in the accompanying drawings will now be described and the nature of its action explained, the scope of the invention being set forth in the appended claims.

In the drawings,

Fig. 1 is a side elevation of part of a locomotive having a feed water heating system embodying the invention applied thereto;

Fig. 2 is a longitudinal central section of the exhaust steam injector shown in Fig. 1 and taken on the line 2—2 of Fig. 3;

Fig. 3 is a plan view, partly in section, of the injector shown in Fig. 2;

Fig. 4 is a section on enlarged scale of part of the nozzle structure shown in Fig. 2;

Fig. 5 is a section on enlarged scale taken on the line 5—5 of Fig. 2;

Fig. 6 is a section taken on the line 6—6 of Fig. 3;

Fig. 7 is a section on enlarged scale of a control valve shown in Fig. 1;

Fig. 8 is a section of a control valve shown in Fig. 2; and

Fig. 9 is a view showing a modification of the valve shown in Fig. 8.

Referring now more particularly to Fig. 1, the locomotive boiler is indicated generally at A, the cab of the locomotive at B and the cylinder of the engine at C.

The feed pump is indicated at D and the exhaust steam injector is indicated generally at E.

Feed water from the tender (not shown) is supplied to the pump D through the suction conduit 10 and is delivered from the pump through the conduit 12 to the water inlet of the injector. Preferably, for reasons hereinafter explained, conduit 12 is provided with a check valve 14 which opens toward the injector as indicated and which is loaded by a relatively light load which may be furnished by a spring such as indicated at 16. Water is delivered to the boiler from the injector through the conduit 18 and the usual boiler check valve 20. Exhaust steam from the engine cylinder C is supplied to the injector through conduit 22 and overflow from the injector is carried to waste through conduit 24.

Live steam for operating the pump D is taken from the boiler turret 26 through the supply conduit 28 in which is located the main control valve F which is preferably situated at a convenient point in the cab B.

The rate of flow of operating steam to the pump is controlled by an automatic pressure responsive valve indicated generally at K which will be more fully described later. Exhaust from the pump is carried either to waste or to any point where the heat of low pressure steam may be utilized through conduit 34.

Preferably, for reasons to be hereinafter explained, the pump D is of the centrifugal or other rotary type although the invention in its broadest aspects is not limited to this specific type of pump. For purposes of illustration, I have indicated a centrifugal pump of known kind having a rotary impeller 36.

In order for the system to be able to supply preheated feed water to the boiler when the engine is not running and exhaust steam is not available, there is provided means for operating the injector E with live steam at reduced pressure hereinafter referred to as auxiilary steam. In the present embodiment, such steam is supplied to the injector through the branch live steam conduit 28a and the injector is further provided with an automatic changeover system operating in response to the presence or absence of exhaust steam to admit auxiliary live steam when such steam is needed and to shut off the supply of this steam when exhaust steam is available. To this end there is provided an exhaust steam valve indicated generally at G, an automatic changeover valve indicated at H and an exhaust steam pressure responsive diaphragm valve indicated at I. Valve G is connected to the live steam supply on the outlet side of the control valve F by means of conduit 38 which, in this instance, is shown connected to the branch conduit 28a. A conduit 40 connects a part of the valve I with the exhaust steam conduit 22, conduit 42 connects another part of this valve with the changeover valve H and still another part of the valve I is connected by means of conduit 44 with a zone of low pressure which in the embodiment shown is a part of the interior of the injector E.

Referring now more particularly to Figs. 2 to 5, the injector E comprises a body 46 providing a steam chamber 48 to which the exhaust steam is supplied from the conduit 22. A flap valve 50 opening into the chamber and pivoted at 52 serves to prevent reverse flow of steam from chamber 48 to the exhaust steam supply conduit when exhaust steam is not available and auxiliary live steam is being used. The main steam nozzle 54 and the water nozzle 56 are fixed in a suitable web 58 in the injector body which web forms a water chamber 60 surounding the steam nozzle 54 and communicating with the nozzle 56. Chamber 60 is in communication with the delivery conduit 12 from the pump D.

The annular water passage between nozzles 54 and 56 is relatively large in area and a sliding sleeve or shroud 55 surrounds nozzle 54. The forward end of this shroud slides in the space between nozzle 54 and a fixed annular ring 62, which as will be observed from Figs. 4 and 5, is provided with a series of peripherally spaced parallel and tapering slots 64, the passages through which provide communication between water chamber 60 and the annular water supply passage formed between nozzles 54 and 56.

A secondary steam nozzle 66 is slidably mounted in the injector body in alignment with the water nozzle and the space between nozzles 56 and 66 is placed in communication with the main steam chamber 48 of the injector by means of the passage 68 formed in the injector body. The injector is further provided with the usual combining tube 70 and delivery tube 72, the latter opening into the delivery chamber 74 which in turn communicates with the delivery conduit 18.

The injector has the usual overflow chamber 76 in communication with the overflow conduit 24.

Communication between the overflow chamber and the overflow conduit is controlled in known manner by an overflow valve (not shown) which valve is loaded by delivery pressure in well-known manner through the medium of a plunger subjected to such pressure and applying a load to the delivery valve through a linkage indicated generally at 78 in Fig. 3. For details of construction of a typical example of loaded overflow valve apparatus of the kind just described, reference may be had to U. S. Patent No. 1,531,004 granted March 24, 1925 to Malcolm Hard and William A. Buckbee.

By reference to Figs. 4 and 5, it will be evident that the area for flow of water to the condensing zone of the injector is greater through the annular passage between nozzles 54 and 56 than through the passages provided by the slots 64 in the ring 62.

The cross sectional area of these slots is therefore the factor which controls the rate of flow of water to the injector and as will be observed from Fig. 4, the area for flow through these slots is determined by the position of adjustment of the shroud 55. In the figure, the shroud is shown in the position for minimum flow of water. To increase the area for flow of water the shroud is moved to the left from the position shown in Fig. 4 and, because of the tapering form of the slots, the effective flow area therethrough will be progressively increased as the shroud is moved toward the left from the position shown.

Movement of shroud 55 is effected in the embodiment shown, by means of a rotary spindle 57 having at its lower end an eccentrically mounted pin 59 operating in a suitable slot cut in the shroud. At its upper end, spindle 57 has attached thereto a lever 61 connected to a control rod 63 which is in turn connected through suitable linkage to a control handle 65 located in the cab of the locomotive. This control determines the rate at which the system operates to feed water to the boiler, by controlling the amount of water flowing to the injector from the pump.

Referring again to the sliding secondary nozzle 66, the quantity of steam admitted to the injector through the secondary steam opening is controlled by the position of longitudinal movement of this nozzle in the casing, and in the embodiment illustrated, the position of this nozzle is determined by the position of rotation of a rotary spindle 80 which has fixed to its lower end the eccentric pin 82 moving in a suitable transverse slot in the nozzle. At its upper end spindle 82 has fixed thereto a lever 84 the end of which is connected by means of a link 86 to the lever 61 attached to the spindle 57. A fixed arm 88 is provided, to which link 86 may be connected by a suitable pin passing through hole 90 in order to hold the lever 84 in a fixed position. When this is done, the pin 92 connecting the link with the lever 61 is removed so as to permit the desired adjustment of the position of spindle 57, with the spindle 80 maintained in fixed position.

Considering now the automatic changeover system for supplying auxiliary steam when exhaust steam is not available, and referring more particularly to Figs. 1, 6 and 7, the construction of the changeover valve apparatus H is as follows. The high pressure live steam conduit 28a communicates with a chamber 98 in the injector body which is in turn in communication with chamber 100 by way of the port 102. A tapered plunger 104 extends into the port 102 to provide a port opening of variable area depending upon the position of the plunger. The upper end of the plunger is located in a cylinder 106 which is in communication with the chamber 98 by way of clearance space around the plunger and the plunger is urged toward its upper position giving maximum area of flow through port 102 by spring 108. Unbalanced steam pressure acting on the top of the plunger tends to move the plunger downwardly into port 102 against the resistance of spring 108.

A port 110 provides communication between the chamber 100 and passage 112 leading to the main steam chamber 48 of the injector. This port is controlled by a changeover valve member 114 having a valve head 116 at its lower end for closing the port and a piston 118 at its upper end which operates in a cylinder 120. A small passage 122 provides constant communication between the steam chamber 98 and the portion of cylinder 120 below piston 118 and a small leak port 124 provides for flow of a limited quantity of steam from the portion of the cylinder 120 below the piston to the portion above. The part of the cylinder above the piston is connected by the conduit 42 to the diaphragm valve I shown in Fig. 7. This valve comprises a casing indicated generally at 126, providing a diaphragm chamber in which is mounted a diaphragm 128 subjected to the pressure of exhaust steam from the exhaust conduit 22 and transmitted to the diaphragm through the connection 40. The diaphragm has attached thereto a valve member 130 movable under the influence of exhaust steam pressure to close communication between the conduit 42 and chamber 132 which is connected by conduit 44 to the low pressure steam chamber 48 of the injector. The spring 134 holds the valve member 130 in open position in the absence of exhaust steam pressure on the diaphragm of sufficient value to overcome the tension of the spring. This tension may be adjusted by means of the adjustment indicated generally at 136.

In the embodiment illustrated, the exhaust valve G consists of a double seated valve member 138 urged toward its seat by spring 140 and having connected thereto a piston 142 operating in a cylinder 144 which is placed in communication with the high pressure steam conduit 28a by the conduit 38. The live steam branch conduit 28a may be advantageously provided with a retarding valve indicated generally at 146, which may be of known construction and which, for the sake of simplicity, has been indicated more or less diagrammatically as a spring loaded check valve loaded by spring 148.

Referring now to Fig. 8, the control valve K is shown which operates to control the delivery pressure from pump D. This valve comprises a casing 150 in which is mounted valve member 152 which is preferably of the balanced type. Valve stem 154 extends upwardly through a suitable packing gland 156 in the valve casing and at its upper end is attached to a diaphragm member 158 carried by a suitable extension 160 attached to the valve casing. Above the diaphragm a cap 162 provides a pressure chamber 164 which is placed in communication with the pump delivery line 12 by means of conduit 166. A suitable abutment 168 is carried by the extension 160 below the diaphragm and a spring 170 is interposed between this abutment and a suitable spring retainer 172 on the valve stem below the diaphragm. The valve stem is preferably made adjustable with respect to the diaphragm by means of a suitable lock nut arrangement indicated generally at 174.

As will be evident from the figure, the spring 170 tends to open the valve to admit operating steam to the pump and the amount of steam admitted to the pump by the valve is governed by the pressure of the pump delivery, which is admitted to chamber 164 and which acts in opposition to the spring. This arrangement acts to maintain the pump delivery pressure at a substantially constant value, the amount of the pressure being predetermined by the strength of the spring and the adjustment of the valve member with respect to the diaphragm.

Turning now to Fig. 9 there is illustrated a form of control valve having an additional feature of control to compensate for variations in temperature of the water delivered from the tender to the pump.

In this embodiment of the apparatus, the features of construction are the same as those described in connection with Fig. 8 except that the spring abutment 168a is adapted to slide on valve stem 154 and is adapted to be moved vertically by means of a lever 176 pivoted at 178 to the extension 160 and bearing at its outer end on a pin 180 which is movable under the influence of an expansive fluid in a bellows chamber provided by bellows 182. The chamber formed by bellows 182 is in communication through a pipe 184 with a thermostat element 186 located in the water supply line 10.

In this embodiment, it will be evident that so long as the temperature of the water supply remains constant the delivery pressure of the pump will be maintained constant by the action of the spring and the pump delivery pressure and that upon an increase in temperature of the water delivered to the pump the valve 152 will be opened by an additional amount to increase the supply of steam to the pump and consequently the delivery pressure to a value determined by the amount of increase in the temperature of the water. With this arrangement, while there is a different value of pump delivery pressure for different water temperatures, it will be observed that the pump delivery pressure is, as in the arrangement shown in Fig. 8, substantially constant for any given water temperature and also substantially constant regardless of the rate at which water is delivered from the pump to the injector, as determined by the position of adjustment of the shroud 55 in the injector. It is consequently to be understood that hereinafter when reference is made to constant pressure of delivery from the pump or to the injector, (which may conveniently be termed booster pressure to distinguish it from final delivery pressure from the injector) such reference is intended to include generically both the arrangements of Figs. 8 and 9 or other equivalent arrangements.

The operation of the apparatus is as follows, assuming the system to be started when the locomotive engine is running and exhaust steam is available. The main control valve is opened to admit operating steam to the conduit 28. At the same time the valve 152 of the control valve K is wide open under the influence of spring 170 and pump D is immediately started at full capacity, causing water to be forced to the injector. The restricted water opening through the water nozzle of the injector causes delivery pressure from the pump to be immediately built up in conduit 12 and this delivery pressure, acting on the diaphragm of the control valve K adjusts this valve to provide the predetermined desired pump delivery pressure.

At the same time, the admission of steam to the supply branch 28a and conduit 38 causes piston 142 to open the valve member 138 of the exhaust valve G and exhaust steam opens the flap valve 50 and flows to nozzles 54 and 66. The mixture of steam and water overflows through the overflow conduit 24 (the overflow valve being unloaded because of lack of delivery pressure) until the jet is established and delivery commences. When this occurs, the overflow valve is loaded by delivery pressure through the loading mechanism including the linkage 78. The function of the retarding valve 146, if it is employed, is to delay the flow of steam to the exhaust valve operating piston sufficiently to permit water to reach the injector ahead of the exhaust steam. This facilitates rapidity of starting of the injector since the injector will commence operation more readily if it is flooded with water before steam is admitted.

The presence of exhaust steam in conduit 22 causes the diaphragm of valve I to keep the valve member 130 in closed position, thus preventing flow of steam through conduit 42 from the changeover valve cylinder 120. When the main control valve F is opened, steam flows through branch 28a to chamber 98 and through passage 122 to cylinder 120. Because of the port 124 through the piston 118, the pressure per unit of area on the two sides of the piston is equalized. Steam also flows through the choke port 102 and exerts pressure on the upper side of the valve head 116. Under these conditions, the combined pressures acting on the changeover valve member 114, due to the differences in areas exposed to the same steam pressure, keep this valve seated as shown in Fig. 6 and prevent the admission of auxiliary steam to the injector.

If it is now assumed that the engine ceases operation and it is desired to continue the feed to the boiler, the main control is allowed to remain open and auxiliary steam is admitted to the injector as follows. The failure of exhaust steam pressure permits spring 134 in the diaphragm valve to open the valve member so as to vent the connection 42 by way of chamber 132 and connection 44 to the low pressure steam chamber of the injector. If desired, the connection 44 may vent 42 directly to atmosphere or any other zone of low pressure. Failure of steam pressure above the piston 118 of the changeover valve, due to venting of connection 42, reverses the balance of forces acting on valve member 114 and the pressure of steam below the piston shifts this valve to open position, thus opening port 110. Live steam from chamber 100 then flows to the main steam chamber of the injector to replace the exhaust steam and as soon as flow commences the plunger 104, in cooperation with the port 102, acts as a throttling choke to reduce the pressure of the auxiliary steam flowing to the injector to a value approximating that of average exhaust steam pressure. Because of the fact that the boiler pressure may vary over comparatively wide limits, the area of the choke port is preferably made variable under the influence of variations in the pressure of the high pressure steam, so as to insure substantially constant auxiliary steam pressure, regardless of variations in boiler pressure.

It is believed that the reverse action of the changeover mechanism in shifting the injector back to exhaust steam operation when exhaust steam is again available, will be evident from the foregoing description.

In the embodiment of apparatus illustrated, the exhaust valve G is open at all times when the system is in operation and this valve is provided to prevent flow of exhaust steam through the injector and out the overflow when the engine is running and the feed heating system is not in operation.

The check valve 14 is provided in order to prevent flow of water through the pump and the overflow of the injector to waste when the system is not in operation and in the event that the injector is placed at a level on the locomotive which is below the level which may be attained by the water supply in the tender tank. It will, of course, be obvious that this check valve may be omitted if the injector is located at a place on the locomotive above the high water level of the tender tank and in this connection it may be pointed out that the usual manually controlled valve for shutting off the supply of water to an injector is not required with the present arrangement.

Control of the amount of water fed to the boiler is effected by adjusting the position of the shroud 59 in the injector, and as previously described, the arrangement is such that when the shroud is moved to the left from the position of minimum adjustment indicated in the figure, the water supplied to the boiler is increased.

It will be understood that while in order to explain the nature of the invention a complete system involving numerous elements of construction has been shown, many of such elements and the specific arrangement thereof may be varied considerably without departing from the spirit or scope of the invention. For example, many changes may be made in the specific details of structure or arrangement of the control system for maintaining the injector in operation when exhaust steam is not available and within the scope of the invention certain features thereof may be used to the exclusion of others. For example, the control system for supplying the injector with auxiliary live steam may be omitted entirely if the conditions surrounding a particular installation are such that it is desirable to rely upon a simple live steam injector to feed to the boiler such quantities of water as may be required when steam is not being used by the main engine.

Those factors in the operation of the system which provide the improvements and advantages thereof will now be briefly pointed out.

The system illustrated presents many advantages from a structural standpoint since it permits application of the several parts of the apparatus in widely separated places on a locomotive where such parts can be placed to the best advantage. Also by supplying water to an exhaust steam injector under pressure and introducing it to the condensing zone of the injector at high velocity, the effectiveness of the injector is greatly enhanced as compared with that of an injector operating with a low pressure head on the water supplied to the injector.

These and other features of general advantage of the apparatus shown form the claimed subject matter of co-pending application Serial No. 36,363 filed August 15, 1935.

As previously pointed out, one of the severe operating conditions attendant upon the operation of a locomotive boiler feeding system is that any given system should have, to be satisfactory, the ability to feed satisfactorily through a wide capacity range. With exhaust steam injectors, one of the most difficult problems to solve has been that of obtaining sufficient capacity range from a given injector, particularly under operating conditions where there is a wide fluctuation in the temperature of the water fed to the injector. In the operation of any injector there is a certain optimum relation between the quantity of water fed and the amount of steam fed to the injector and when this relation is established the injector jet has the greatest stability. If now with a given rate of admission of steam the amount of water fed to the injector is cut down, the stability of the jet decreases until a point is reached where the jet fails because the supply of water is insufficient to condense the amount of steam supplied. It may be said that as the capacity of the injector is decreased through diminished water supply the density of the jet decreases and if this is carried sufficiently far the jet will fail. On the other hand, if the optimum relation is disturbed by increasing the relative amount of water supplied to the injector, a point will be reached where the steam supplied to the injector will be unable to force the increased amount of water to the boiler and spill will occur. The injector may continue to operate with the excess water spilling through the overflow, even when the overflow valve is loaded by delivery pressure but under this condition the operation of the injector is very unstable and if the relative amount of water is increased beyond a certain amount, the jet will fail because of the excess of water being supplied.

By supplying water under pressure to the injector and at high velocity to the condensing zone of the injector, the capacity limits of the injector are materially increased as compared with feeding water by gravity or under a low pressure head. However in order to obtain maximum capacity range, and particularly in order to decrease the minimum capacity of a given injector, it is important that the booster pressure be not decreased as the capacity of the system is decreased. In accordance with one of the important features of the present invention, this is accomplished by maintaining substantially constant booster pressure from the pump throughout the range of capacities of the system and by controlling the capacity of the system through regulation of the amount of water supplied at a substantially constant booster pressure, to the combining zone of the injector.

Where high velocity of entry of the water to the combining zone of the injector is employed, as in accordance with the principles of the present invention, the ordinary form of annular water admission nozzle is not practical since the clearance space between the walls of any annular nozzle opening of reasonably dimensioned nozzles must be so small that the passage is continually subject to clogging from the impurities contained in feed water of the kind which is available for locomotive boilers. In order to provide for proper feeding of water to the injector, the multiple jet water nozzle construction afforded by the arrangement hereinbefore described is provided, since with a series of jets, sufficient cross sectional area can be provided for each of the jets to insure against clogging while at the same time not having a total area of flow which is too great.

It will be evident that other specific forms of nozzle construction may be employed but it has been found that the multiple jet arrangement, which may conveniently be referred to as a shower nozzle, is practically very effective, particularly when used in conjunction with the shroud construction shown. When water is fed under pressure to an injector of the kind in which regulation of the amount of water fed is accomplished through the medium of a movable nozzle construction, difficulty is encountered in preventing leakage of water past the movable nozzle surfaces to the steam chamber and other parts of the injector from which water should be excluded. By reference to Fig. 4 of the drawings, it will be evident that with the sliding shroud construction therein disclosed, there is no possibility of the water at high pressure from chamber 60 escaping therefrom except through the passages through which it is intended to flow. Any small amount of leakage between the outer surface of shroud 55 and the web 58 will flow inside of the shroud around the nozzle 54 and be delivered to the combining zone of the injector in a manner which does not detract from the satisfactory operation of the injector.

It will be noted that in the construction of the injector as shown in Fig. 2, provision is made for primary and secondary admission of exhaust steam. It will further be noted that in this construction the primary steam nozzle 54 is a diverging nozzle. This form of nozzle is most effective in producing the highest velocity of the steam at the point where it meets the entering water and it will be noted further that the water and the steam from the primary nozzle come together in nearly parallel lines of flow. This condition makes for the greatest effectiveness of the water forcing section of the jet. On the other hand, the secondary steam inlet through nozzle 66 has converging flow. Velocity of steam at this point is not so high nor is the steam directed into the jet at as advantageous an angle from the forcing standpoint. Consequently the secondary jet may be regarded as being most effective as a heating jet for raising the temperature of the water. In order to take advantage of this, the opening for secondary admission of steam is advantageously varied so that the maximum quantity of steam that it is possible to condense under any given set of operating conditions, will be condensed. Since the amount of steam which can be condensed is dependent among other things upon the quantity of water being admitted to the injector the sliding nozzle 66 is interconnected with the water control so that as the rate of water is increased from minimum, the secondary steam nozzle is moved from its position of minimum opening so as to increase the area for flow of secondary steam to the injector. This arrangement is however effective only under certain conditions of water temperature. Practical tests of construction of the kind shown have demonstrated that if the temperature of the water as supplied to the injector exceeds 70° F. its condensing power is so reduced that increasing the supply of secondary steam as the water supply is increased, results in decreasing the maximum capacity of operation of the injector. It is for this reason that means are provided which enable the secondary steam nozzle to be fixed in the position of minimum opening. Ordinarily the change of the secondary nozzle arrangement from a condition giving fixed opening to a condition giving variable opening is necessary, in the case of locomotive installations, only twice a year. It has been found from experience that with this arrangement, satisfactory operation of the injector, while securing the advantages of maximum exhaust steam condensation, may be obtained by maintaining the secondary steam nozzle in fixed position only during the summer months and by having it arranged to be adjusted in accordance with the adjustment of the water opening during the remainder of the year.

It will be evident that in a system of the character disclosed, the booster pressure for forcing water to the injector is obtained at the expense of utilizing live steam to operate the forcing pump. Tests have conclusively proved that the overall thermal savings attainable by this arrangement, as compared with the thermal savings attainable with an exhaust steam injector alone, more than compensate for the live steam used by the pump. With an exhaust steam injector alone, some live steam has to be used to supplement the exhaust steam supply, if the injector is to be able to deliver against the pressures of modern boilers. Therefore, the steam used by the pump in the present arrangement is not a net loss as compared with the exhaust steam injector arrangement alone. It is evident, however, that the thermal effectiveness of the system will be greater, the less the quantity of live steam used for operating the pump. In order therefore to reduce the amount of live steam used by the pump, the arrangement shown in Fig. 9 may advantageously be employed. Other things being equal, the capacity range of an injector and the ability of the injector to deliver against a given head is determined by the temperature of the water delivered to the injector. The colder the water, the better the injector action. From this it follows that with relatively cold or cool water supplied to it, a given exhaust steam injector will deliver against a given boiler pressure with less booster pressure than is required under the same circumstances but with warm or hot water delivered to the injector. With the thermostat arrangement shown, the pump regulating valve may be adjusted to provide a booster pressure of predetermined value which is the minimum required for satisfactory operation with cold suction water. This adjustment will provide for minimum consumption of live steam by the pump. Then when conditions arise which result in supplying warm water to the pump, the action of the thermostat on the regulating valve will serve to increase the booster pressure, thus enabling the injector to continue operation with the warmer water, because of the fact that the pressure differential between booster pressure and the final delivery pressure is decreased.

While high booster pressure is obtained at the expense of live steam for operating the pump, and from this standpoint booster pressure should not be excessive, tests have shown that the high velocity of entry of water into the injector is more important from the thermal standpoint than is the obtaining of the lowest possible booster pressure when the system is considered as a whole. In order that what is considered as providing the most satisfactory results may be clearly understood the following example is given by way of illustration, which however is not to be considered as limiting.

Let it be assumed that a boiler feeding system embodying the invention is to deliver feed water to a boiler operating at 300 pounds per square inch and that the system is further required to feed to the boiler through a capacity range of which the minimum is approximately 24,000 pounds per hour and the maximum approximately 50,000 pounds per hour. Further, let it be assumed that the system must operate with reasonable capacity range, although not necessarily maximum capacity range, with a water supply which may have a temperature as high as 90° F. In a system without compensation for variation in water temperature, the area for flow of water through the shower nozzle should vary from approximately .0733 square inch at minimum to .1531 square inch at maximum and the pump regulating means should be adjusted so as to provide a pump booster pressure to the injector of approximately 300 pounds per square inch. With booster pressure regulated to compensate for increase in water temperature, the adjustment may advantageously be made so that the booster pressure is approximately 200 pounds per square inch when cold water is supplied to the pump, that is, water in the range of which the upper limit is of the order of 45° F., and rises to a value of approximately 300 pounds per square inch upon rise in water temperature to approximately 90° F.

To illustrate in another way that it is desired to attain, it may be said that the relation of the booster pressure to the area of the water nozzle, and also the character of the passages for flow of water through the nozzle should be such that the water is brought into contact with the steam in the condensing zone of the injector, at a velocity which is within a range of which the lower limit is of the order of 173 feet per second and of which the upper limit is of the order of 210 feet per second.

To secure the most satisfactory character of injector operation in a system embodying the invention, it is desirable to use a rotary pump, preferably of the centrifugal type. The reason for this is that with such a type of pump it is easy to avoid fluctuations in the pressure of the water as delivered to the injector and absence of pressure fluctuations is highly desirable to good injector operation. The system is operative with reciprocating pumps but with the pressure fluctuations which it is almost impossible to avoid with pumps of this kind, the injector, while continuing to operate, tends to spill intermittently, upon drop in booster pressure, and such spill is of course undesirable.

While in compliance with the requirements of the patent statutes, apparatus of preferred form has been shown for purposes of illustration, it will be understood that the scope of the invention is limited only by the scope of the appended claims which are to be considered as covering all variations in mode of operation and forms of apparatus falling within the terms of the claims when they are construed as broadly as is consistent with the state of the prior art.

We claim:

1. A system for supplying heated feed water to a boiler including an exhaust steam injector for delivering heated feed water to a boiler, said injector having a water inlet of variable area for controlling the rate at which water is delivered by the system, a pump for delivering water to said inlet under pressure, means for varying the area of said inlet, and automatic control means for maintaining said pressure substantially constant regardless of variations in the rate at which water is delivered by the system.

2. A system for supplying heated feed water to a boiler including an exhaust steam injector for delivering heated feed water to a boiler, said injector having a water inlet of variable area for controlling the rate at which water is delivered by the system, a pump for delivering water to said inlet under pressure, means for varying the area of said inlet, and means responsive to the delivery pressure from the pump for maintaining said delivery pressure substantially constant regardless of variations in the rate at which water is delivered by the system.

3. In a boiler feeding system, an exhaust steam injector for delivering heated feed water to a boiler, said injector having a water inlet of variable area for controlling the rate at which water is delivered by the system, a pump for delivering water to said inlet under pressure, means for varying the area of said inlet, means for maintaining the delivery pressure from the pump substantially constant independent of variations in the area of said inlet, and means for increasing, in accordance with increase in the temperature of the water supply, the value of the substantially constant pressure at which water is delivered by the pump.

4. A system for supplying heated feed water to a boiler including an exhaust steam injector for delivering heated feed water to a boiler, said injector having a water inlet of variable area for controlling the rate at which water is delivered by the system, a steam operated mechanical pump for delivering water under pressure to said inlet, means for varying the area of said inlet, and a pump governing valve responsive to pump delivery pressure for regulating the supply of steam to the pump to maintain substantially constant delivery pressure therefrom.

5. In a boiler feeding system, an exhaust steam injector for delivering heated feed water to a boiler, said injector having a water inlet of variable area for controlling the rate at which water is delivered by the system, a steam operated mechanical pump for delivering water under pressure to said inlet, means for varying the area of said inlet, and pump governing valve means responsive to pump delivery pressure and to the temperature of the water supply for regulating the supply of steam to the pump to maintain substantially constant delivery pressure therefrom for any given water temperature and to increase the value of said constant delivery pressure upon increase in the temperature of the water supply.

6. In the operation of a boiler feeding system of the kind comprising an exhaust steam injector and pump means delivering water under pressure to the injector, that improvement which consists in feeding water at high pressure to the injector and at high velocity to the condensing zone of the injector, varying the capacity of the system to feed water by varying the area of the water inlet of the injector, and automatically maintaining the pressure at which water is supplied to said inlet substantially constant for all normal operating variations in the area of said inlet.

7. In the operation of a boiler feeding system of the kind comprising an exhaust steam injector and pump means delivering water under pressure to the injector, that improvement which consists in varying the capacity of the system to feed water by varying the area of the water inlet of the injector, maintaining the pressure at which water of given temperature is supplied to said inlet substantially constant regardless of variations in the areas of the inlet, and increasing the value of the pressure at which water is delivered to the inlet upon increase in the temperature of the water from said given value.

8. A system for feeding boilers from an external source of feed water including, in combination, an exhaust steam injector having a main steam nozzle and a shower nozzle for delivering water into contact with the steam from said main steam nozzle, means for conducting the delivery from said injector to the boiler, means for elevating the pressure of feed water from said source and delivering it at elevated pressure to the inlet side of said shower nozzle, whereby to cause the water to be supplied to the condensing zone of the injector at high velocity and regulating means for controlling the rate of supply of feed water to the boiler comprising means for varying the area for flow of water through said shower nozzle.

9. A system for feeding boilers from an external source of feed water including, in combination, means for elevating the pressure of water from said source to high pressure and for delivering it at its elevated pressure, an exhaust steam injector receiving the water delivered at said elevated pressure and connected to deliver feed water to the boiler, said injector having a main steam nozzle, a water chamber in communication with said means, a shower nozzle interposed between said water chamber and the delivery end of said main steam nozzle, said shower nozzle providing a plurality of passages for flow of water, and regulating means for controlling the rate at which feed water is delivered to the boiler including means movable to vary the cross sectional area for flow of water through said passages.

10. A system for feeding boilers from an external source of feed water including, in combination, means for elevating the pressure of water from said source to high pressure and for delivering it at its elevated pressure, an exhaust steam injector receiving the water delivered at said elevated pressure and connected to deliver feed water to the boiler, said injector having a main steam nozzle, a water chamber in communication with said means, a shroud slidably mounted on said main steam nozzle, means interposed between said water chamber and the outlet end of said main steam nozzle and cooperating with said shroud to provide a plurality of passages for flow of water to the condensing zone of the injector, the cross-sectional area of said passages being variable in accordance with the position of adjustment of said shroud and regulating means for controlling the rate at which feed water is supplied to the boiler including means for shifting the position of said shroud relative to said passages.

11. A system for feeding boilers from an external source of feed water including, in combination, means for elevating the pressure of water from said source to high pressure and for delivering it at its elevated pressure, an exhaust steam injector receiving the water delivered at said elevated pressure and connected to deliver feed water to the boiler, said injector having a main steam nozzle, a water chamber in communication with said means, means cooperating with the outlet end of said main steam nozzle to form an annular space for flow of water into contact with steam emerging from said nozzle, a shroud slidably mounted around said nozzle, an annular ring fixed in the injector around said shroud and a plurality of tapering slots through said ring, the walls of said slots and the outer surface of said shroud defining a plurality of passages for flow of water from said water chamber to said annular space, the cross-sectional area of said passages being determined by the position of adjustment of said shroud and the combined cross-sectional area of said passages being less than the cross-sectional area of the annular space at the outlet end of said main steam nozzle, and regulating means for controlling the rate of supply of feed water to the boiler including means for adjusting the position of said shroud relative to said passages.

12. In apparatus of the character described, an exhaust steam injector having a water chamber adapted to be connected to a high pressure feed water supply, a main steam nozzle and a shower nozzle interposed between said water chamber and the delivery end of said steam nozzle for delivering water to the condensing zone of the injector in a plurality of separate high velocity streams, said shower nozzle providing a total cross-sectional area of water opening determining the rate of flow of water to the combining zone of the injector and including means movable to vary said area to control the amount of water delivered by the injector.

13. In an exhaust steam injector, a main steam nozzle, a water chamber around said nozzle, a shower nozzle interposed between said water chamber and the delivery end of said main steam nozzle, said shower nozzle providing a plurality of passages for flow of water from the water chamber to the condensing zone of the injector and means movable to vary the cross-sectional area for flow of water through said passages.

14. An exhaust steam injector having a main steam nozzle, a water chamber around said nozzle, means cooperating with the outlet end of said nozzle to form an annular space for flow of water into contact with steam emerging from said nozzle, a shroud slidably mounted around said nozzle, an annular ring fixed in the injector around said shroud and a plurality of tapering slots through said ring, the walls of said slots and the outer surface of said shroud defining a plurality of passages for flow of water from said water chamber to said annular space, the cross-sectional area of said passages being determined by the position of adjustment of said shroud and the combined cross-sectional area of said passages being less than the cross-sectional area of the annular space at the outlet end of said nozzle and means for adjusting the position of said shroud relative to said passages.

15. In the operation of a boiler feeding system comprising a pump and an exhaust steam injector for supplying feed water to the boiler from an external low pressure source, that improvement which consists in feeding water to the injector from the pump at elevated and substantially constant pressure, converting the pressure energy of the water into high velocity and delivering the water in a plurality of high velocity streams to the condensing zone of the injector and controlling the rate at which feed water is supplied to the boiler by varying the area for flow of water in said streams.

16. In the operation of a boiler feeding system comprising a pump and an exhaust steam injector for supplying feed water to the boiler from an external low pressure source, that improvement which consists in feeding water to the injector from the pump at elevated and substantially constant pressure, converting the pressure energy of the water into high velocity at the condensing zone of the injector, condensing exhaust steam delivered to said condensing zone with the high velocity water to establish a forcing jet, raising the temperature of said jet by condensing therewith a secondary supply of exhaust steam and controlling the rate at which feed water is supplied to the boiler by varying the area for admission of the high velocity constant pressure water to said condensing zone.

17. In a boiler feeding system for supplying feed water to a boiler from an external low pressure source, an exhaust steam injector for delivering feed water to the boiler, a pump for withdrawing water from said source and delivering it to said injector, manually operable control means for regulating the rate at which feed water is delivered to the boiler, said control means comprising an element adjustable to vary the area for the admission of water to the injector and automatic pump regulating means for causing said pump to deliver water to the injector at substantially constant pressure regardless of the position of adjustment of said manually operable means.

EMANUEL RAWSON.
ARTHUR WILLIAMS.